(12) United States Patent
Kimura et al.

(10) Patent No.: US 10,253,668 B2
(45) Date of Patent: Apr. 9, 2019

(54) UREA SCR SYSTEM

(71) Applicant: HINO MOTORS, LTD., Tokyo (JP)

(72) Inventors: Makoto Kimura, Hino (JP); Yugo Yoshioka, Hino (JP)

(73) Assignee: Hino Motors, Ltd., Tokyo (JP)

( * ) Notice: Subject to any disclaimer, the term of this patent is extended or adjusted under 35 U.S.C. 154(b) by 0 days.

(21) Appl. No.: 16/002,744

(22) Filed: Jun. 7, 2018

(65) Prior Publication Data

US 2018/0363524 A1 Dec. 20, 2018

(30) Foreign Application Priority Data

Jun. 20, 2017 (JP) .................................. 2017-120421
Jun. 20, 2017 (JP) .................................. 2017-120422

(51) Int. Cl.
| F01N 3/20 | (2006.01) |
| F01N 3/08 | (2006.01) |
| F01N 11/00 | (2006.01) |
| B01D 53/94 | (2006.01) |

(52) U.S. Cl.
CPC ....... F01N 3/0814 (2013.01); B01D 53/9418 (2013.01); B01D 53/9495 (2013.01); F01N 3/0842 (2013.01); F01N 3/208 (2013.01); F01N 11/002 (2013.01); F01N 2570/14 (2013.01); F01N 2610/02 (2013.01); F01N 2900/1808 (2013.01)

(58) Field of Classification Search
CPC ... F01N 3/20; F01N 3/08; F01N 3/208; F01N 3/0184; B01D 53/94; B01D 53/9418
USPC .............................. 60/285, 286, 288; 422/168
See application file for complete search history.

(56) References Cited

U.S. PATENT DOCUMENTS

| 2007/0193253 A1* | 8/2007 | Tsumagari | B01D 53/9409 60/286 |
| 2010/0122521 A1* | 5/2010 | Sun | F01N 3/208 60/284 |
| 2013/0028806 A1* | 1/2013 | Igarashi | F01N 3/025 422/170 |
| 2014/0325961 A1* | 11/2014 | Yokota | F01N 3/208 60/274 |

FOREIGN PATENT DOCUMENTS

| JP | 2008075620 A | * | 4/2008 |
| JP | 2015-001208 A |   | 1/2015 |

* cited by examiner

*Primary Examiner* — Tom P Duong
(74) *Attorney, Agent, or Firm* — Kilpatrick Townsend & Stockton LLP

(57) ABSTRACT

A urea SCR system includes a tank that stores urea water, an injector that injects urea water to exhaust gas, a connection passage that connects the tank and the injector, an electric pump that is arranged at the connection passage and delivers urea water from the tank toward the injector or from the injector toward the tank, and a control device that controls the electric pump and the injector. The control device executes a suction-back operation for driving the electric pump so that urea water contained in the injector is suctioned back to the tank. Further, the control device determines whether or not the injector is stuck closed.

11 Claims, 3 Drawing Sheets

UREA SCR SYSTEM

CROSS-REFERENCE TO RELATED APPLICATIONS

This application claims priority to Japanese Patent Application No. 2017-120421, Jun. 20, 2017, and also claims priority to Japanese Patent Application No. 2017-120422, Jun. 20, 2017, the disclosures of which are incorporated by reference herein in their entireties.

BACKGROUND OF THE INVENTION

The present disclosure relates to a urea SCR system.

Japanese Laid-Open Patent Publication No. 2015-001208 describes a known example of a urea selective catalytic reduction (SCR) system serving as an exhaust purification device that purifies exhaust by detoxifying nitrogen oxide (hereinafter referred to as "NOx"). The urea SCR device uses a urea water adding device including an injector that injects urea water to exhaust gas and a selective reduction catalyst located downstream of the position where the urea water is added. In the urea SCR system, the urea water added to exhaust gas is hydrolyzed to ammonia by the heat of the exhaust gas. When the exhaust gas containing the ammonia flows into the selective reduction catalyst, NOx in the exhaust gas is reduced to nitrogen and water by the ammonia serving as a reducing agent.

In the urea SCR system, urea contained in urea water may crystalize. In some cases, this causes the injector to be stuck closed. When the injector is stuck closed, it will be difficult to add urea water to exhaust gas. Thus, there is a demand for determining with high precision whether or not the injector is stuck closed. Additionally, there is a demand for a technique for quickly overcoming stuck closing of the injector that results from crystallization of urea.

SUMMARY

A urea SCR system according to one aspect of the present disclosure includes a tank that stores urea water, an injector configured to inject urea water to exhaust gas flowing in a section upstream of a selective reduction catalyst arranged in an exhaust passage of an engine, a connection passage that connects the tank and the injector, an electric pump arranged at the connection passage and configured to deliver urea water from the tank toward the injector or from the injector toward the tank, and a control device configured to control the electric pump and the injector. The control device is configured to execute a determination process when an ignition switch of the engine is turned on, the determination process includes a forcibly-delivering operation for forcibly delivering urea water to the injector by rotating the electric pump in a forward direction in a state in which the injector is controlled to a closed state, a suction-back operation for suctioning back urea water to a position in the connection passage located between the electric pump and the injector by rotating the electric pump in a reverse direction and temporarily controlling the injector to an open state after the forcibly-delivering operation, and determining whether or not the injector is stuck closed. If the control device determines that the injector is stuck closed, the control device continues the determination process by repeating the forcibly-delivering operation, the suction-back operation, and the determining.

A urea SCR system includes a tank that stores urea water, an injector configured to inject urea water to exhaust gas flowing in a section upstream of a selective reduction catalyst arranged in an exhaust passage of an engine, a connection passage that connects the tank and the injector, an electric pump arranged at the connection passage and configured to deliver urea water from the tank toward the injector or from the injector toward the tank, and a control device configured to control the electric pump and the injector. The control device executes a suction-back operation for driving the electric pump and temporarily controlling the injector to an open state so that urea water contained in the injector is suctioned back to the tank. The control device determines that the injector is stuck closed if a value indicating a load on the electric pump during the suction-back operation is greater than a threshold value.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION

A urea SCR system according to one embodiment will now be described with reference to FIGS. 1 to 6B.

Figure 1:
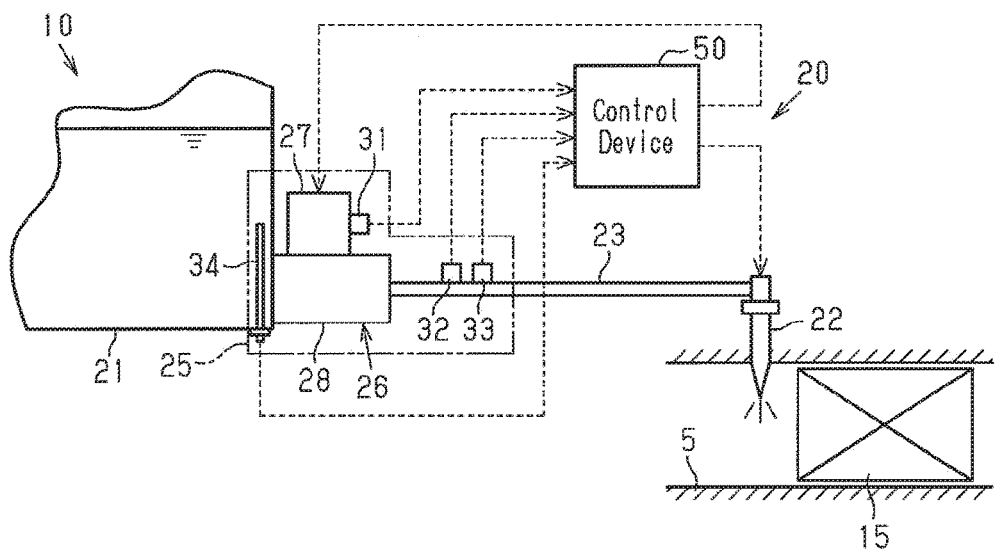
FIG. 1 is a diagram illustrating the schematic structure of a urea SCR system according to one embodiment.

As shown in FIG. 1, a urea SCR system 10 includes a selective reduction catalyst 15 and a urea water adding device 20. The selective reduction catalyst 15 is arranged in an exhaust passage 5 through which exhaust gas of the engine (not shown) flows. The urea water adding device 20 adds urea water to exhaust gas flowing in a section upstream of the selective reduction catalyst 15 in the exhaust passage 5.

The selective reduction catalyst 15 causes ammonia hydrolyzed from urea water added by the urea water adding device 20 to react with NOx contained in exhaust gas so that the NOx is reduced to nitrogen and water. In the selective reduction catalyst 15, various types of catalytic metal such as copper-based material, iron-based material, and vanadium-based material are supported by, for example, a flow-through monolithic support made of ceramic or stainless steel having an excellent heat resistance. The selective reduction catalyst 15 has a temperature range of, for example, 150° C. to 350° C., as an activation temperature.

The urea water adding device 20 includes a tank 21 that stores urea water, an electronically-controlled injector 22 that injects urea water to the exhaust passage 5, a connection passage 23 that connects the tank 21 and the injector 22, and a pump unit 25 arranged at the connection passage 23. Further, the urea water adding device 20 includes a control device 50 that controls driving of an electric pump 26 of the pump unit 25 and opening/closing of the injector 22.

The electric pump 26 includes a motor 27 that is supplied with direct-current voltage from a power supply device (not shown) and a pump 28 that is driven by the motor 27. The motor 27 is rotated in the forward direction when supplied with a positive voltage (+V) from the power supply device through the control device 50 and rotated in the reverse direction when supplied with a negative voltage (−V) from the power supply device through the control device 50.

The pump 28 bi-directionally delivers urea water between the tank 21 and the injector 22. That is, the pump 28 delivers urea water from the tank 21 toward the injector 22 and from the injector 22 toward the tank 21. For example, the pump 28 is a gear pump including a driver gear driven by the motor 27 and a follower gear rotated by the driver gear. The pump 28 is configured to be rotated in the forward direction by forward-rotation of the motor 27 and forcibly deliver urea water contained in the tank 21 toward the injector 22. Further, the pump 28 is configured to be rotated in the reverse direction by reverse-rotation of the motor 27 and suction back urea water contained in the injector 22 toward the tank 21. The pump unit 25 has a relief function to cause excess urea water to flow back to the tank 21 when the discharge pressure on the side corresponding to the injector 22 exceeds a set pressure $Pu1$.

The pump unit 25 includes a current sensor 31 that detects the magnitude of drive current $Im$ of the motor 27 as an electrical characteristic of the motor 27. The drive current $Im$ is a parameter indicating the load on the electric pump 26. Further, the pump unit 25 includes a pressure sensor 32 that detects the pressure $Pu$ of urea water downstream of the pump 28, a temperature sensor 33 that detects the temperature of urea water, a level sensor 34 that detects the amount of urea water stored in the tank 21, and the like. The various types of sensors 31 to 34 execute detection in a predetermined cycle and output detection signals indicating the detection values to the control device 50.

Figure 2:
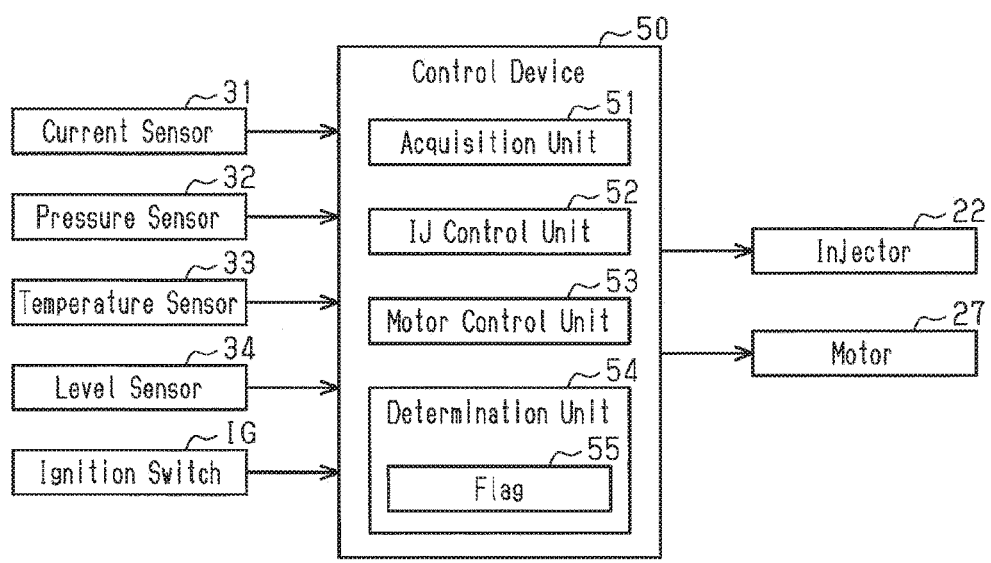
FIG. 2 is a functional block diagram illustrating part of the electric configuration of the urea SCR system.

As shown in FIG. 2, the control device 50 is configured mainly by one or more microcomputers in which a processor, memory, input interface, output interface, and the like are connected to one another by a bus. The control device 50 executes various types of processes based on various types of information obtained via the input interface and various types of control programs and various types of data stored in the memory. The control device 50 may be configured by circuitry including 1) one or more dedicated hardware circuits such as ASIC, 2) one or more processors running on computer programs (software), or 3) a combination thereof. The processor includes a CPU and memories such as a ROM and a RAM. The memories store program codes or instructions configured to cause the CPU to execute processes. The memory, or computer readable medium, includes any type of medium that is accessible by a versatile computer or dedicated computer. The control device 50 outputs control signals generated based on various types of processes to various types of control subjects via the output interface. For example, when an ignition switch IG is turned on to start the engine, the control device 50 executes a determination process including determining whether or not the injector 22 is stuck closed and then starts an addition process for adding urea water to exhaust gas. Further, when the engine is stopped, the control device 50 executes a stopping process for suctioning back urea water contained in the injector 22, the connection passage 23, and the pump 28 to the tank 21.

The control device 50 includes, as various types of function units, an acquisition unit 51, an IJ control unit 52, a motor control unit 53, and a determination unit 54. The acquisition unit 51 acquires detection values of the various types of sensors 31 to 34 and operation signals from the ignition switch IG. The IJ control unit 52 controls opening/closing of the injector 22. The motor control unit 53 performs PWM control to control supply voltage V from the power supply device (not shown) toward the motor 27. The determination unit 54 determines whether or not the injector 22 is stuck closed. The determination unit 54 maintains a flag 55 in a predetermined region of a memory. The flag 55 indicates whether or not the previous determination process ends without overcoming stuck closing of the injector 22.

The procedures for the determination process will now be described with reference to FIG. 3. As described above, the determination process is executed when the acquisition unit 51 acquires operation signals of turning on the ignition switch IG.

Figure 3:
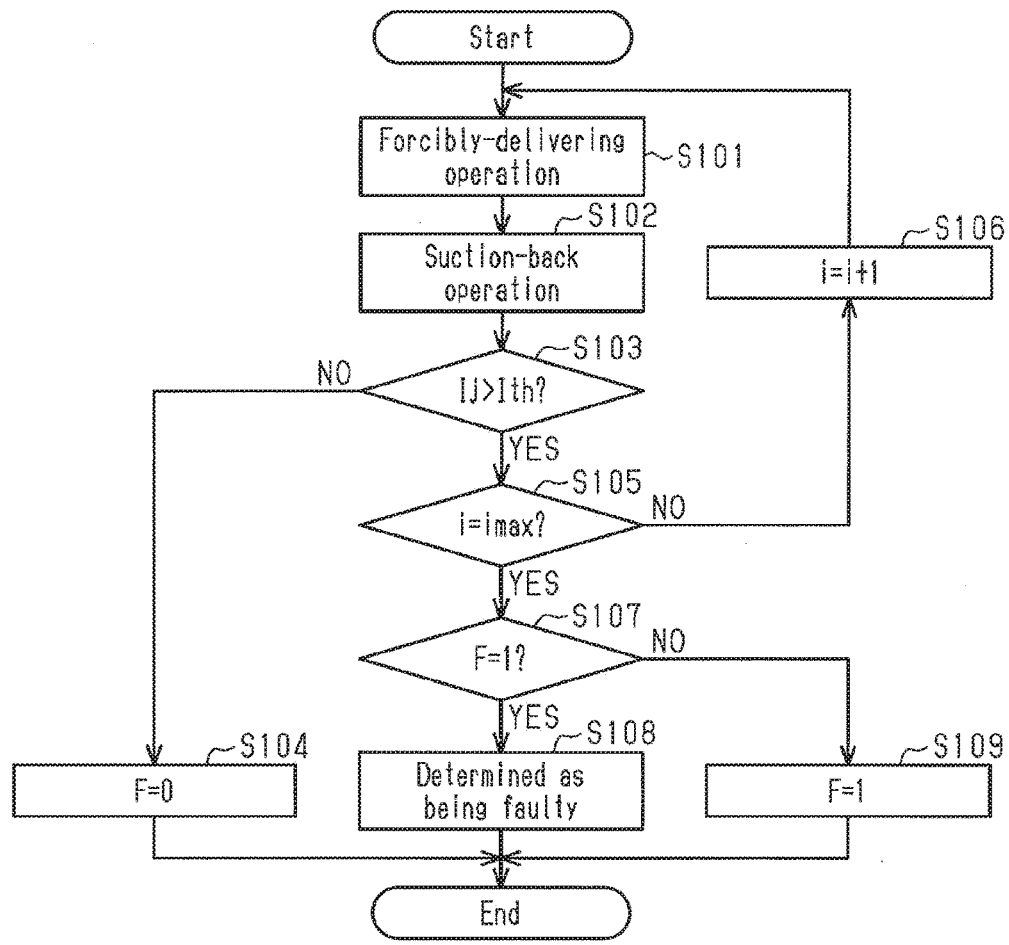
FIG. 3 is a flowchart illustrating one example of the procedure for a determination process.

As shown in FIG. 3, a forcibly-delivering operation for forcibly delivering urea water to the injector 22 is first performed (step S101). In the forcibly-delivering operation, the acquisition unit 51 repeatedly acquires the pressure $Pu$, and the IJ control unit 52 keeps the injector 22 controlled to a closed state. The motor control unit 53 controls the supply voltage V (positive voltage) to the motor 27 so that the pressure $Pu$ acquired by the acquisition unit 51 becomes the set pressure $Pu1$. The forcibly-delivering period in which the forcibly-delivering operation is performed is a sufficient period (for example, three seconds) for the injector 22 to be filled with urea water having the set pressure $Pu1$.

Subsequent to the forcibly-delivering operation, a suction-back operation is performed (step S102). In the suction-back operation, urea water contained in the injector 22 is suctioned back to a certain position in the connection passage 23 located between the pump 28 and the injector 22. In the suction-back operation, the acquisition unit 51 repeatedly acquires the value of the drive current $Im$. The motor control unit 53 controls the supply voltage V (negative voltage) to the motor 27 so that the rotation speed N of the motor 27 becomes a target rotation speed $Nt$. The motor control unit 53 calculates a counter-electromotive force of the motor 27 by substituting a value of the drive current $Im$ acquired by the acquisition unit 51 and a value of the controlled supply voltage V (negative voltage) into an arithmetic equation including these values and the like as variables. Then, the motor control unit 53 calculates the rotation speed N from the calculated counter-electromotive force. The IJ control unit 52 temporarily controls the injector 22 to an open state.

Figure 4:
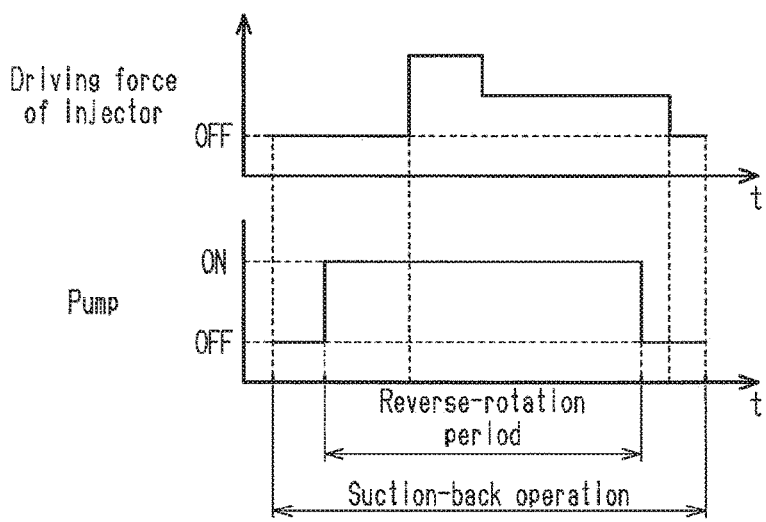
FIG. 4 is a graph illustrating one example of the relationship of a reverse-rotation period of a pump and a drive force of an injector in a suction-back operation.

As shown in FIG. 4, in the suction-back operation, the IJ control unit 52 controls the injector 22 to the open state during a reverse-rotation period of the pump 28 in which the motor control unit 53 is rotating the motor 27 in the reverse direction and controls the injector 22 to the closed state immediately after the reverse-rotation period ends.

Figure 5A:
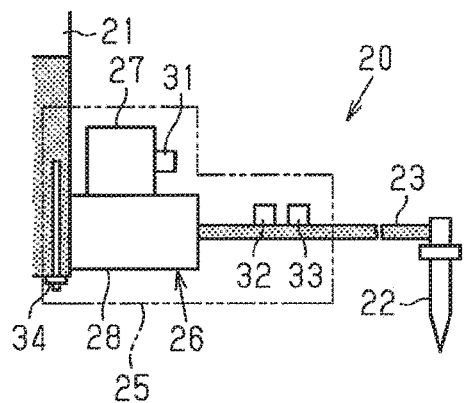
FIG. 5A is a schematic diagram illustrating the distribution of urea water after a forcibly-delivering operation.
Figure 5B:
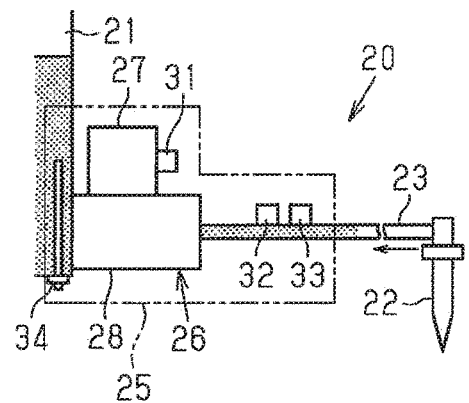
FIG. 5B is a schematic diagram illustrating the distribution of urea water after a suction-back operation when the injector is not stuck closed.

As shown in FIGS. 5A and 5B, the maximum suction-back amount of the pump 28 in the suction-back operation, that is, the suction-back amount in a case in which the injector 22 is not stuck closed, is set to be smaller than a value obtained by adding the volume of a section of the connection passage 23 from the pump 28 to the injector 22 and the volume of the injector 22. In FIGS. 5A and 5B, portions in which urea water exists are shown by dots. Thus, regardless of whether or not the injector 22 is stuck closed, the pump 28 is kept filled with urea water when the suction-back operation ends.

In the suction-back operation, the pressure Pu detected by the pressure sensor 32 is negative. Thus, if the suction-back operation is performed within a short period of time, mechanical loads on the connection passage 23 and the injector 22 may be excessively large. Such mechanical loads are large in particular when the injector 22 is stuck closed. Thus, the target rotation speed Nt of the motor 27 and the reverse-rotation period are set so that the suction-back operation is performed over a longer period (for example, five seconds) than that of the forcibly-delivering operation in order to reduce the mechanical loads on the connection passage 23 and the injector 22.

Subsequently, the determination unit 54 performs various types of determination. The determination unit 54 first determines whether or not the injector 22 is stuck closed by comparing, with a threshold value Ith, a subject determination value Ij based on the drive current Im, which is acquired by the acquisition unit 51 in the suction-back operation (step S103). The process of step S103 corresponds to a primary determination process for determining whether or not the injector 22 is stuck closed.

Figure 6A:
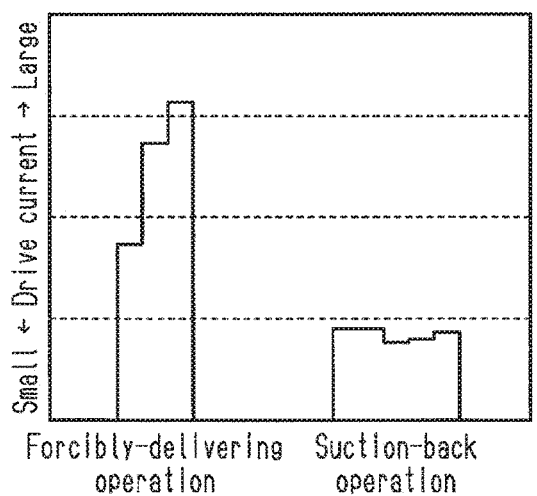
FIG. 6A is a graph illustrating one example of drive current when the injector is stuck closed.
Figure 6B:
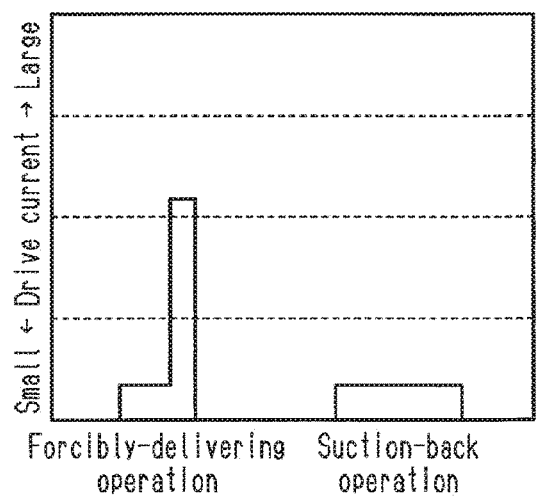
FIG. 6B is a graph illustrating one example of the drive current when the injector is not stuck closed.

The threshold value Ith will now be described with reference to FIGS. 6A and 6B. FIG. 6A is a graph illustrating one example of a measurement result of the drive current Im when the injector 22 is stuck closed. FIG. 6B is a graph illustrating one example of a measurement result of the drive current Im at a normal time in which the injector 22 is not stuck closed.

As shown in FIGS. 6A and 6B, it was found out that the drive current Im unstably transitioned in the forcibly-delivering operation whereas the drive current Im stably transitioned in the suction-back operation regardless of whether or not the injector 22 was stuck closed. Further, with regard to the suction-back operation performed when the injector 22 was stuck closed, it was found out that the drive current Im was large since gas in the exhaust passage 5 did not flow into the injector 22 and a large load acted on the motor 27 in order to keep the rotation speed N at the target rotation speed Nt. Accordingly, the inventors of the present application decided that whether or not the injector 22 was stuck closed should be determined based on the drive current Im in the suction-back operation, in which the drive current Im stably transitioned. In addition, the inventors of the present application repeatedly measured the drive current Im in the suction-back operation and used the measurement result to set, as the threshold value Ith, a value used to determine with high reliability whether or not the injector 22 was stuck closed.

The subject determination value Ij only needs to be based on the drive current Im acquired by the acquisition unit 51 during the reverse-rotation period. For example, the subject determination value Ij may be an average value of the drive current Im acquired by the acquisition unit 51 during the reverse-rotation period. Alternatively, the subject determination value Ij may be a value of the drive current Im acquired by the acquisition unit 51 after a predetermined time has elapsed from when reverse-rotation of the motor 27 started, for example, a value of the drive current Im acquired by the acquisition unit 51 immediately before the reverse-rotation of the motor 27 ends.

If the subject determination value Ij is less than or equal to the threshold value Ith (step S103: NO), the determination unit 54 determines that the injector 22 is not stuck closed and resets the flag 55 to 0 (F=0: step S104). If the flag 55 is reset to 0 by the determination unit 54, the control device 50 ends the determination process. If the flag 55 is reset to 0, the control device 50 executes a process for adding urea water after the determination process ends. In the addition process, the control device 50 adds urea water to exhaust gas through the injector 22 on the condition that the catalyst temperature of the selective reduction catalyst 15 is the activation temperature.

If the subject determination value Ij is greater than the threshold value Ith (step S103: YES), the determination unit 54 determines whether or not a determination count i (initial value=1), which is the number of times the determination of step S103 is performed in a single determination process, has reached a maximum determination count imax (step S105). The determination count i may also be referred to as the stuck closed determination count i. The maximum determination count imax is the maximum value of the number of times the process of step S103 is executed in a single determination process. The "single determination process" refers to a determination process from when the process shown in the flowchart of FIG. 3 is started by turning on the ignition switch IG to when the process shown in the flowchart ends. Further, the process of step S105 corresponds to a secondary determination process for determining whether or not the injector 22 is stuck closed.

With regard to the determination count i, for example, a counter that counts the determination count i (initial value=1) is incorporated in the determination unit 54. The determination unit 54 executes the process of step S105 based on a count value of the counter. If the determination count i has not reached the maximum determination count imax (step S105: NO), the determination unit 54 increments the count value of the incorporated counter (step S106). Subsequently, after the forcibly-delivering operation (step S101) and the suction-back operation (step S102) are performed again, the determination unit 54 determines again whether or not the injector 22 is stuck closed (step S103). The forcibly-delivering operations, the suction-back operations, and the determinations made by the determination unit 54 that are performed from the second time may be executed while the engine is running.

If the determination count i has reached the maximum determination count imax (step S105: YES), that is, if the number of times the injector 22 is determined as being stuck closed has reached the maximum determination count imax in the current determination process, the determination unit 54 determines whether or not the flag 55 is set to 1 (F=1?: step S107). If the flag 55 is set to 1 (step S107: YES), that is, if the number of times the injector 22 is determined as being stuck closed reached the maximum determination count imax both in the previous determination process and the current determination process, the determination unit 54 determines that the injector 22 is faulty (step S108). If the determination unit 54 determines that the injector 22 is faulty, the control device 50 ends the determination process and suspends execution of the addition process by controlling the motor 27 and the injector 22 to a stopped state. Further, the control device 50 notifies the driver of a fault occurring in the urea SCR system 10 by, for example, switching on a warning light (not shown).

If the flag 55 is not set to 1 (step S107: NO), the determination unit 54 sets the flag 55 to 1 (F=1: step S109) and ends the determination process. If the flag 55 is set to 1, the control device 50 suspends execution of the addition process, that is, controls the motor 27 and the injector 22 to the stopped state.

Here, the maximum determination count imax will be further described. If determination is performed n times (n is integer greater than or equal to 1, determination count i is n), the determination process takes time required for performing the forcibly-delivering operation n times and time required for performing the suction-back operation n times. In the addition process, urea water is added from when the catalyst temperature of the selective reduction catalyst 15 reaches the activation temperature. Thus, the maximum determination count imax is set so that the duration of the determination process is shorter than the time for the catalyst temperature to reach the activation temperature during cold start of the engine and so that the duration of the determination process is a time highly likely for crystalized urea to dissolve. The maximum determination count imax is set to, for example, 40 to 50. The maximum determination count imax is set based on the results of experiments and simulations that have been conducted in advance.

The operation of the urea SCR system 10 will now be described.

In the urea SCR system 10, when the ignition switch IG is turned on, the forcibly-delivering operation and the suction-back operation are first performed. After the suction-back operation, if the injector 22 is determined as being stuck closed, the forcibly-delivering operation, the suction-back operation, and the determination of whether or not the injector 22 is stuck closed are performed again. Such repetition of the forcibly-delivering operation and the suction-back operation dissolves urea crystalized in the injector 22. This overcomes stuck closing of the injector 22.

The urea SCR system 10 of the above embodiment has the advantages described below.

(1) Crystallization of urea causes the injector 22 to be stuck closed. This can be overcome by dissolving the crystalized urea. In the determination process, if it is repeatedly determined that the injector 22 is stuck closed, the forcibly-delivering operation and the suction-back operation are repeated. That is, the pressure of urea water varies around the crystalized urea. This promotes dissolution of the urea crystalized in the injector 22. Further, the determination unit 54 makes determination for each suction-back operation so that whether or not the injector 22 is stuck closed is determined with high precision.

In the suction-back operation, urea water remains in the portion of the connection passage 23 located between the electric pump 26 and the injector 22. This shortens the time required for the forcibly-delivering operation after the suction-back operation in addition to the time required for the suction-back operation. That is, the shortening of the time required for the forcibly-delivering operation and the suction-back operation increases the number of times the pressure of urea water varies in the injector 22 per unit of time. This quickly overcomes stuck closing of the injector 22 resulting from crystallization of urea.

(2) The determination unit 54 determines whether or not the determination count i has reached the maximum determination count imax in the determination process. The maximum determination count imax is a value at which the duration of the determination process is shorter than the time for the catalyst temperature to reach the activation temperature during cold start of the engine and the duration of the determination process is a time highly likely for crystalized urea to dissolve. That is, if stuck closing of the injector 22 results from crystallization of urea, the stuck closing of the injector 22 is overcome before the determination count i reaches the maximum determination count imax. If the determination count i has reached the maximum determination count imax, there is a high possibility of stuck closing of the injector 22 not resulting from crystallization of urea. Thus, if the determination count i has reached the maximum determination count imax, the determination process is ended.

(3) If the determination unit 54 determines that the injector 22 is stuck closed, more specifically, if the determination unit 54 makes the secondary determination that the injector 22 is stuck closed in step S105, the control device 50 suspends execution of the addition process. This avoids wasteful power consumption. That is, since the electric pump 26 and the injector 22 are not driven, wasteful power consumption is avoided.

(4) In the determination process, if the determination count i has reached the maximum determination count imax and if the flag 55 is reset to 0, the determination unit 54 sets the flag 55 to 1 and determines that the injector 22 is faulty (tentative determination or primary determination). In the determination process, if the determination count i has reached the maximum determination count imax and if the flag 55 is set to 1, the determination unit 54 determines that the injector 22 is faulty (main determination or secondary determination). That is, the determination process is performed each time the ignition switch IG of the engine is turned on. If the determination count i reached the maximum determination count imax in the previous determination process and if the determination count i has reached the maximum determination count imax in the current determination process, the determination unit 54 determines that the injector 22 is faulty. Such a configuration further increases the reliability for the determination of whether or not the injector 22 is faulty. Additionally, measures to be taken when the injector 22 is determined as being faulty are easy to set.

(5) The control device 50 has a state in which the forcibly-delivering operation, the suction-back operation, and the determination made by the determination unit 54 are performed while the engine is running. With such a configuration, for example, even if the injector 22 is determined as being stuck closed immediately after the ignition switch IG is turned on, the forcibly-delivering operations, the suction-back operations, and the determinations made by the determination unit 54 that are performed from the second time are performed while the engine is running. This overcomes stuck closing of the injector 22 that results from crystallization of urea without changing the drivability of starting the engine.

(6) As shown in FIGS. 6A and 6B, the value of the drive current Im stably transitions during the suction-back operation. Thus, whether or not the injector 22 is stuck closed is highly precisely determined by using the value of the drive current Im during the suction-back operation as the subject determination value Ij of whether or not the injector 22 is stuck closed. That is, since the load on the electric pump 26 differs depending on whether or not the injector 22 is stuck closed during the suction-back operation, whether or not the injector 22 is stuck closed is determined with high precision based on the load on the electric pump 26. More specifically, if the supply voltage to the electric pump 26 is controlled so that the rotation speed of the electric pump 26 becomes the target rotation speed in the suction-back operation, the injector 22 is determined as being stuck closed when the value of the drive current Im is greater than the threshold value.

(7) If the value of the drive current Im immediately before the reverse-rotation period of the pump 28 ends is set to the subject determination value Ij, the determination of whether or not the injector 22 is stuck closed is made based on a state immediately before the reverse-rotation period ends. Thus, for example, even if crystalized urea dissolves immediately before the reverse-rotation period ends, the injector 22 is determined as being not stuck closed. This avoids excessive execution of the forcibly-delivering operation, the suction-back operation, and the determination made by the determination unit 54. This shortens the average time required for the determination process.

(8) If the average value of the drive current Im acquired by the acquisition unit 51 during the reverse-rotation period of the pump 28 is set to the subject determination value Ij, the reliability of the determination result that the injector 22 is not stuck closed when the subject determination value Ij is less than or equal to the threshold value Ith increases.

(9) In the suction-back operation, the injector 22 is controlled to the open state after the reverse-rotation of the pump 28 is started. This limits the supply of urea water to the exhaust passage 5 in the suction-back operation.

(10) In the suction-back operation, the injector 22 is controlled to the closed state after the reverse-rotation of the pump 28 is stopped. Thus, the injector 22 can be controlled to the closed state after, for example, decelerating urea water moving with inertia through the connection passage 23 toward the tank 21. This reduces the impact resulting from a sudden change in the movement amount of the urea water and thus limits the mechanical load acting on the connection passage 23 and the injector 22.

It should be apparent to those skilled in the art that the present invention may be embodied in many other specific forms without departing from the spirit or scope of the invention. Particularly, it should be understood that the present invention may be embodied in the following forms.

The control device 50 may perform the forcibly-delivering operation, the suction-back operation, and the determination made by the determination unit 54 only during a period from when the ignition switch IG is turned on to when the engine is started. Such a configuration allows for determination that the injector 22 is stuck closed before the engine is started. Thus, if the injector 22 is stuck closed, the engine is controlled under the assumption that the urea SCR system does not add urea water.

Even if the injector 22 is determined as being stuck closed, the control device 50 may execute, for example, a trial injection process in which the injector 22 injects urea water for each predetermined time on a trial basis. If the stuck closing of the injector 22 is overcome in the trial injection process, the control device 50 may subsequently proceed to the addition process. The trial injection process allows for determination of whether or not the injector 22 is stuck closed based on, for example, variation or the like in the pressure Pu.

The flag 55 may be omitted from the control device 50. With such a configuration, the control device 50 determines that the injector 22 is faulty if the determination count i has reached the maximum determination count imax. That is, the processes of steps S107 and S109 are omitted.

The maximum determination count imax is not limited to a predetermined value and may be, for example, a value set for an ambient temperature. With such a configuration, the control device 50 obtains the ambient temperature based on a detection signal of an ambient temperature sensor detecting the ambient temperature and stores determination count data, which is table data having the maximum determination count imax for the ambient temperature, in a predetermined region of the memory. Then, the control device 50 sets the maximum determination count imax by reading the maximum determination count imax corresponding to the ambient temperature from the determination count data. In the determination count data, the maximum determination count imax is set, for each ambient temperature, to a value at which the duration of the determination process is shorter than the time for the catalyst temperature to reach the activation temperature during cold start of the engine and the duration of the determination process is the time for crystalized urea to dissolve highly likely.

In the urea SCR system, a heating unit that heats urea water delivered forcibly by the pump 28 toward the injector 22 may be incorporated in the pump unit 25. In the heating unit, supply power is controlled by the control device 50. With such a configuration, for example, if the injector 22 is determined as being stuck closed in the initial determination of the determination process, the forcibly-delivering operations and the suction-back operations performed from the second time are performed while heating urea water. This facilitates dissolution of crystalized urea and thus further quickly overcomes stuck closing of the injector 22, which results from crystallization of urea.

The condition of the control device 50 ending the determination process if the injector 22 is successively determined as being stuck closed in a single determination process is not limited to the determination count i. For example, the control device 50 may end the determination process if a predetermined time has elapsed from when the determination process was started. Alternatively, the control device 50 may end the determination process if the catalyst temperature of the selective reduction catalyst 15 is sufficiently approximate to the activation temperature.

In the suction-back operation, the control device 50 may start rotating the motor 27 in the reverse direction and control the injector 22 to the open state at the same timing.

In the suction-back operation, the control device 50 may stop the motor 27 and control the injector 22 to the closed state at the same timing.

The determination unit 54 only needs to determine whether or not the injector 22 is stuck closed based on the load on the motor 27 in the suction-back operation, that is, the electrical characteristic of the motor 27. Thus, the determination unit 54 does not have to be configured to control the supply voltage V (negative voltage) so that the rotation speed N of the motor 27 becomes the target rotation speed Nt and to determine whether or not the injector 22 is stuck closed based on the magnitude of the drive current Im. The motor 27, which is supplied with direct-current voltage, has a characteristic in which the drive current Im increases as the torque becomes large as long as the supply voltage V is fixed and a characteristic in which the rotation speed N decreases as the torque becomes large as long as the supply voltage V is fixed. Thus, for example, since the load on the motor 27 increases in the suction-back operation when the injector 22 is stuck closed, the control device 50 may drive the motor 27 with the fixed supply voltage V (negative voltage) during the reverse-rotation period and determine whether or not the injector 22 is stuck closed based on the drive current Im and the rotation speed N. Alternatively, for example, the control device 50 may control the supply voltage V (negative voltage) so that the drive current Im is fixed and determine whether or not the injector 22 is stuck closed based on the magnitude of the supply voltage V and a duty cycle of PWM control. Even such a configuration allows for highly precise determination of whether or not the injector 22 is stuck closed. In addition, the determination unit 54 may determine whether or not the injector 22 is stuck closed based on the pressure Pu in the suction-back operation instead of the electrical characteristic of the motor 27 in the suction-back operation.

In the forcibly-delivering operations performed from the second time, urea water remains in the connection passage 23. Thus, the forcibly-delivering period may be shorter than that of the first forcibly-delivering operation. Such a configuration further increases the number of times the pressure of urea water varies in the injector 22 per unit of time.

Therefore, the present examples and embodiments are to be considered as illustrative and not restrictive and the invention is not to be limited to the details given herein, but may be modified within the scope and equivalence of the appended claims.

What is claimed is:

1. A urea SCR system comprising:
   a tank that stores urea water;
   an injector configured to inject urea water to exhaust gas flowing in a section upstream of a selective reduction catalyst arranged in an exhaust passage of an engine;
   a connection passage that connects the tank and the injector;
   an electric pump arranged at the connection passage, wherein the electric pump is configured to deliver urea water from the tank toward the injector or from the injector toward the tank; and
   an electronic control device configured to control the electric pump and the injector, wherein
   the electronic control device comprises a determination unit, wherein the determination unit is configured to execute a determination process when an ignition switch of the engine is turned on,
   the determination process includes
      a forcibly-delivering operation for forcibly delivering urea water to the injector by rotating the electric pump in a forward direction in a state in which the injector is controlled to a closed state,
      a suction-back operation for suctioning back urea water to a position in the connection passage located between the electric pump and the injector by rotating the electric pump in a reverse direction and temporarily controlling the injector to an open state after the forcibly-delivering operation, and
      determining whether or not the injector is stuck closed, and
   if the control device determines that the injector is stuck closed, the control device continues the determination process by repeating the forcibly-delivering operation, the suction-back operation, and the determining whether or not the injector is stuck closed.

2. The urea SCR system according to claim 1, wherein the electronic control device ends the determination process if a stuck closed determination count, which is a number of times the electronic control device determines that the injector is stuck closed in the continued determination process, has reached a maximum determination count.

3. The urea SCR system according to claim 2, wherein the electronic control device determines that the injector is faulty if the stuck closed determination count reached the maximum determination count in a previous determination process and if the stuck closed determination count has reached the maximum determination count in the current determination process.

4. The urea SCR system according to claim 1, wherein the electronic control device suspends addition of urea water to exhaust gas if the control device determines that the injector is stuck closed.

5. The urea SCR system according to claim 1, wherein the electronic control device stops driving the injector and the electric pump if a stuck closed determination count, which is a number of times the electronic control device determines that the injector is stuck closed, has reached a maximum determination count.

6. The urea SCR system according to claim 1, wherein the electronic control device has a state in which the forcibly-delivering operation, the suction-back operation, and the determining are performed while the engine is running.

7. A urea SCR system comprising:
   a tank that stores urea water;
   an injector configured to inject urea water to exhaust gas flowing in a section upstream of a selective reduction catalyst arranged in an exhaust passage of an engine;
   a connection passage that connects the tank and the injector;
   an electric pump arranged at the connection passage, wherein the electric pump is configured to deliver urea water from the tank toward the injector or from the injector toward the tank; and
   an electronic control device configured to control the electric pump and the injector, wherein
   the electronic control device executes a suction-back operation for driving the electric pump and temporarily controlling the injector to an open state so that urea water contained in the injector is suctioned back to the tank, and
   the electronic control device determines that the injector is stuck closed if a value indicating a load on the electric pump during the suction-back operation is greater than a threshold value.

8. The urea SCR system according to claim 7, wherein the electronic control device is configured to control supply voltage to the electric pump so that a rotation speed of the electric pump becomes a target rotation speed in the suction-back operation and obtain a value of drive current to the electric pump as the value indicating the load.

9. The urea SCR system according to claim 7, wherein the electronic control device is configured to control the injector to the open state after starting driving the electric pump in the suction-back operation.

10. The urea SCR system according to claim 7, wherein the electronic control device is configured to control the injector to a closed state after the electric pump stops in the suction-back operation.

11. The urea SCR system according to claim 7, wherein
    the electronic control device is configured to perform the suction-back operation after a forcibly-delivering operation for forcibly delivering urea water to the injector in a state in which the injector is controlled to a closed state, and
    if the electronic control device determines that the injector is stuck closed, the control device repeats the forcibly-delivering operation, the suction-back operation, and determination of whether or not the injector is stuck closed.

* * * * *